US012792505B2

(12) United States Patent
Ju et al.

(10) Patent No.: US 12,792,505 B2
(45) Date of Patent: Nov. 10, 2026

(54) STORAGE DEVICE FOR CONTROLLING VENDOR UNIQUE COMMAND (VUC), MEMORY SYSTEM INCLUDING THE STORAGE DEVICE, AND METHOD OF CONTROLLING THE VUC

(71) Applicant: SAMSUNG ELECTRONICS CO., LTD., Suwon-si (KR)

(72) Inventors: Myeongjong Ju, Suwon-si (KR); Kyungwoo Noh, Suwon-si (KR); Jisoo Kim, Suwon-si (KR); Younsung Chu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 18/910,571

(22) Filed: Oct. 9, 2024

(65) Prior Publication Data

US 2025/0147879 A1 May 8, 2025

(30) Foreign Application Priority Data

Nov. 8, 2023 (KR) ........................ 10-2023-0153994

(51) Int. Cl.
*G06F 12/02* (2006.01)

(52) U.S. Cl.
CPC ................................ *G06F 12/0246* (2013.01)

(58) Field of Classification Search
CPC ............. G06F 12/02; G06F 2212/7202; G06F 12/1009; G06F 3/064; G06F 2212/401; G06F 12/0246; G06F 12/0292; G06F 3/0661; G06F 3/0679; G06F 12/0646; G06F 12/00
USPC ....... 711/103, 118, 144, 207, 154, 170, 205, 711/12.001, 12.017
See application file for complete search history.

(56) References Cited

U.S. PATENT DOCUMENTS 6,247,132 B1 6/2001 Kawamura
7,509,441 B1 * 3/2009 Merry .................. G06F 3/0604 710/36
9,251,381 B1 2/2016 Merry et al.
10,168,958 B2 1/2019 Yokota
10,523,444 B2 * 12/2019 Strong ................. G06F 21/602
11,423,129 B2 8/2022 Kim et al.
2008/0271164 A1 * 10/2008 Dellow .................. G06F 21/76 726/30
2013/0007324 A1 * 1/2013 Moore ................. G06F 1/3215 710/200
2020/0341775 A1 * 10/2020 Mathew ............... G06F 9/4401
2023/0105153 A1 4/2023 Fang et al.

FOREIGN PATENT DOCUMENTS

KR 10-2178330 B1 11/2020

* cited by examiner

*Primary Examiner* — Jared I Rutz
*Assistant Examiner* — Edward Waddy, Jr.
(74) *Attorney, Agent, or Firm* — Sughrue Mion, PLLC

(57) ABSTRACT

A storage device includes a memory and a memory controller configured to control the memory. The memory controller includes a one-time programmable (OTP) module, the OTP module including a hardware area and being configured to store, in the hardware area, a logic bit indicating an initial operation restriction state of an instruction code. The memory controller is configured to output an operation restriction state of a vendor unique command (VUC) based on a state table corresponding to the instruction code.

20 Claims, 14 Drawing Sheets

FIG. 5

| Logical Bit | Contents | Description |
|---|---|---|
| k+31:k | OPCODE_DEFAULT_LOCK0 | INITIAL OPERATION RESTRICTION STATE OF "Opcode00~Opcode31 |
| k+63:k+32 | OPCODE_DEFAULT_LOCK1 | INITIAL OPERATION RESTRICTION STATE OF "Opcode32~Opcode63 |
| ... | ... | ... |

STORAGE DEVICE FOR CONTROLLING VENDOR UNIQUE COMMAND (VUC), MEMORY SYSTEM INCLUDING THE STORAGE DEVICE, AND METHOD OF CONTROLLING THE VUC

CROSS-REFERENCE TO RELATED APPLICATION

This application is based on and claims priority under 35 U.S.C. § 119 to Korean Patent Application No. 10-2023-0153994, filed on Nov. 8, 2023, in the Korean Intellectual Property Office, the disclosure of which is incorporated by reference herein in its entirety.

BACKGROUND

One or more example embodiments of the disclosure relate to a storage device including a memory controller, a memory system, and a control method, and more particularly, to a storage device capable of controlling a vendor unique command (VUC), a memory system including the storage device, and a method of controlling the VUC.

A VUC refers to an instruction that is not disclosed to the general public and is limited to specific entities, such as a manufacturer. A VUC may be an instruction for identifying or testing an internal state of a storage device, and thus, when the VUC is exposed, user information may be leaked.

When an operation of controlling the VUC is performed based on software, a critical problem may occur, such as exposure of important information to an attacker who possesses the software or is aware of a control format of the VUC. Therefore, there is an increasing need for security techniques that resolve such vulnerability.

SUMMARY

One or more example embodiments of the disclosure provide a storage device, a memory system, and a control method, in which security with respect to controlling a vendor unique command (VUC) may be enhanced and convenience with respect thereto may be improved.

According to an aspect of one or more example embodiments of the disclosure, there is provided a storage device including a memory, and a memory controller configured to control the memory, wherein the memory controller includes a one-time programmable (OTP) module, the OTP module including a hardware area and being configured to store, in the hardware area, a logic bit indicating an initial operation restriction state of an instruction code, and wherein the memory controller is configured to output an operation restriction state of a vendor unique command (VUC) based on a state table corresponding to the instruction code.

According to an aspect of one or more example embodiments of the disclosure, there is provided a method of controlling a vendor unique command (VUC), the method including extracting a logic bit from a one-time programmable (OTP) module, the logic bit indicating an initial operation restriction state of an instruction code, setting, based on the logic bit, a state table corresponding to the instruction code, and determining, based on the state table, whether an operation restriction is set with respect to the VUC received from a host.

According to an aspect of one or more example embodiments of the disclosure, there is provided a memory system including a host device configured to output a vendor unique command (VUC), and a storage device configured to determine whether an operation restriction is set with respect to the VUC, wherein the storage device includes a one-time programmable (OTP) module, the OTP module including a hardware area and being configured to store, in the hardware area, a logic bit indicating an initial operation restriction state of an instruction code, and the storage device is further configured to set a state table corresponding to the instruction code, based on the logic bit.

BRIEF DESCRIPTION OF DRAWINGS

Example embodiments will be more clearly understood from the following detailed description taken in conjunction with the accompanying drawings, in which:

FIG. 5 illustrates an example for describing an operation restriction state of a VUC, according to one or more example embodiments;

DETAILED DESCRIPTION

Hereinafter, example embodiments are described in detail with reference to the accompanying drawings.

Figure 1:
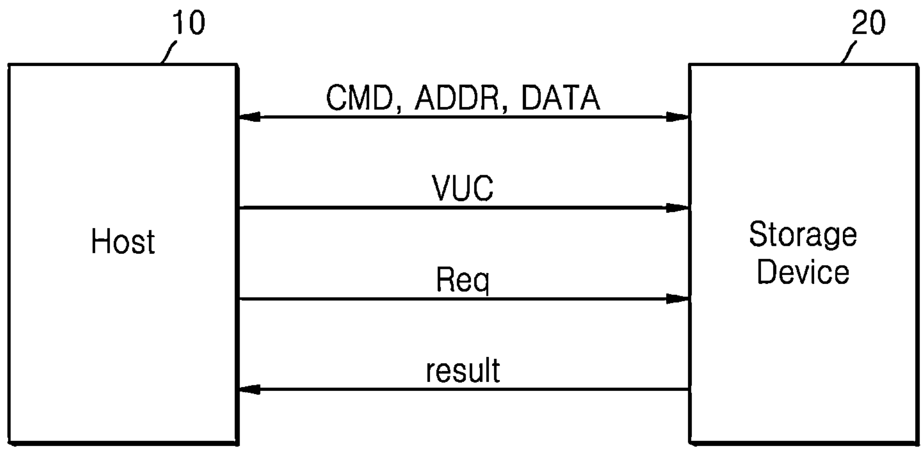
FIG. 1 is a block diagram of a memory system according to one or more example embodiments.

FIG. 1 is a block diagram of a memory system according to one or more example embodiments.

Referring to FIG. 1, the memory system according to one or more example embodiments may include a host device 10 and a storage device 20. The host device 10 may transmit a vendor unique command (VUC) for controlling the storage device 20. The host device 10 may transmit the VUC in a form of a data packet. The VUC may refer to a unique command (or function) used to identify an internal state of the storage device or establish an environment of the storage device. The VUC may be used to correct, control, and/or add a pre-set characteristic or function to the storage device 20.

Separately from the above operations with respect to the VUC, the host device 10 may transmit and/or receive a command CMD, an address ADDR, and/or data DATA to and/or from the storage device 20. The command CMD, the address ADDR, and the data DATA may be related to memory processing operations, such as a read operation, a write operation, and an erase operation, separately from instructions with respect to the VUC.

Also, according to one or more embodiments, the host device 10 may transmit various requests to the storage device 20. For example, as described below, the request may include a change request Req for changing a state table stored in the storage device 20, and based on the change request Req, the storage device 20 may perform an operation of determining whether or not the host device 10 is a legitimate user.

The host device 10 may include, for example, portable electronic devices such as a cellular phone, an MP3 player, a laptop computer, etc. or electronic devices such as a desktop computer, a game machine, a television (TV), a projector, etc. That is, the host device 10 may include various wired or wireless electronic devices. Also, the host device 10 may include at least one operating system (OS). The OS may generally manage and control functions and operations of the host device 10 and may provide various operations of the memory system for controlling the VUC. The OS may be divided into a personal OS and a corporate OS according to a user's use environment. For example, the personal OS may be specialized for supporting a function of providing services to general users and may include the Windows, Chrome, etc. and the corporate OS may be specialized for attaining and supporting high performance and may include a Windows server, Linux, Unix, etc. Also, a mobile OS, an example of the OS, may be specialized for supporting a function of providing mobile services to users and a power-saving function for a system and may include Android, iOS, Windows mobile, etc. The host device 10 may include a plurality of operating systems and may execute an OS for performing an operation with the storage device 30 in response to a request from a user.

The storage device 20 may receive a VUC from the host device 10 and perform corresponding operations. The storage device 20 may determine, based on an operation restriction state of the VUC, whether or not to perform an operation corresponding to the VUC. For example, when the storage device 20 determines an operation state of the VUC received from the host device 10 as a lock state, the storage device 20 may not perform an operation corresponding to the VUC.

According to one or more embodiments, in response to the change request Req received from the host device 10, the storage device 20 may transmit a result to the host device 10. According to one or more embodiments, the change request Req may be a request for changing a state table stored in the storage device 20 as described below, and after the storage device 20 determines whether the host device 10 is a legitimate user, the storage device 20 may transmit, to the host device 10, a result indicating a response with respect to whether or not the state table is changeable as requested.

Separately from the operation with respect to the VUC described above, the storage device 20 may transmit and/or receive a command CMD, an address ADDR, and/or data DATA to and/or from the host device 10. That is, the storage device 20 may operate in response to the command CMD from the host device 10, and in particular, the storage device 20 may store the data DATA accessed by the host device 10. In other words, the storage device 20 may be used as a main memory device or an auxiliary memory device of the host device 10. The storage device 20 may be implemented as any one of various types of storage devices, according to a host interface protocol connected to the host device 10.

For example, the storage device 20 may include any one of various types of storage devices, such as a solid state drive (SSD), a multi-media card (MMC), an embedded MMC (eMMC), a reduced-size MMC (RS-MMC), an MMC of a micro-MMC type, a secure digital (SD) card of an SD type, a mini-SD type, or a micro-SD type, a universal storage bus (USB), a universal flash storage (UFS), a compact flash (CF) card, a smart media card (SMC), a memory stick, etc. Also, the storage device 20 may include a volatile memory device such as a dynamic random-access memory (DRAM), a static random-access memory (SRAM), etc. and/or a nonvolatile memory device such as read-only memory (ROM), a mask ROM (MROM), a programmable ROM (PROM), an erasable programmable ROM (EPROM), an electrically erasable programmable ROM (EEPROM), a ferromagnetic ROM (FROM), a phase-change ROM (PROM), a magnetic ROM (MROM), a resistive ROM (RROM), a flash memory, etc. According to one or more embodiments, when the storage device 20 is an SSD, the storage device 20 may be any one of a portable SSD, a client SSD (cSSD), a data center SSD (DC SSD), and an enterprise SSD (EP SSD).

Figure 2:
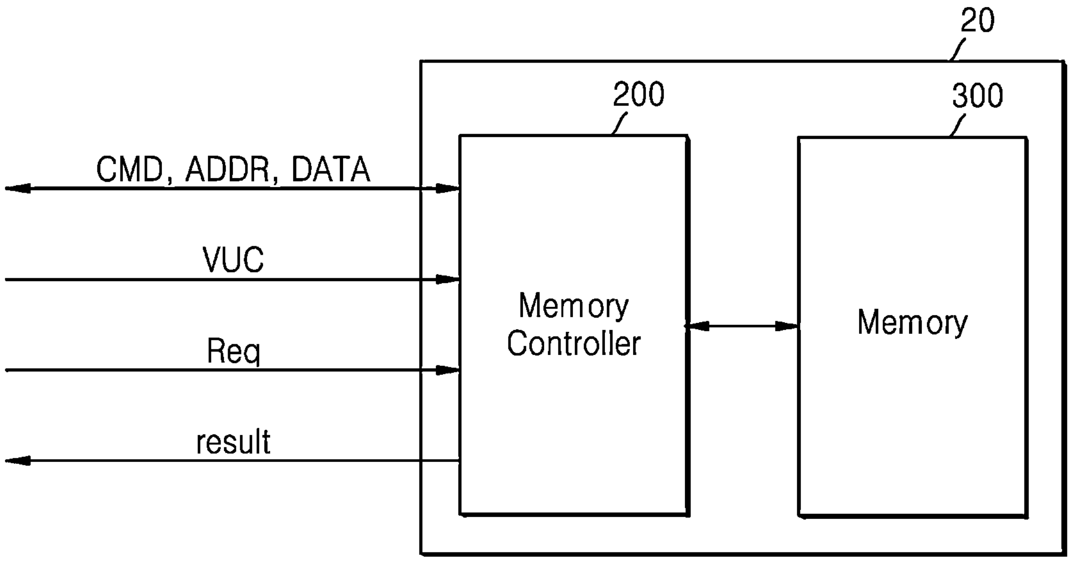
FIG. 2 is a block diagram of a storage device according to one or more example embodiments.

FIG. 2 is a block diagram of a storage device according to one or more example embodiments.

Referring to FIGS. 1 and 2, the storage device 20 may include a memory controller 200 and a memory 300. The memory controller 200 and the memory 300 may be integrated into one semiconductor device. For example, the memory controller 200 and the memory 300 may be integrated into one semiconductor device and may form an SSD. When the storage device 20 is implemented as an SSD, an operation speed of the host device 10 connected to the storage device 20 may be improved.

According to one or more embodiments, the memory controller 200 and the memory 300 may be integrated into one semiconductor device and may form a memory card. For example, the memory card may include personal computer memory card international association (PCMCIA), a CF card, an SMC, a memory stick, an MMC (an RS-MMC or a micro-MMC), an SD card (a miniSD card, a microSD card, or an SDHC card), a UFS, etc. According to another embodiment, the storage device 20 may be included in a computer, a ultra-mobile PC (UMPC), a workstation, a net-book, a personal digital assistant (PDA), a portable computer, a web tablet, a tablet computer, a wireless phone, a mobile phone, a smartphone, an electronic book (e-book), a portable multimedia player (PMP), a portable game machine, a navigation device, a black box, a digital camera, a digital multimedia broadcasting (DMB) player, a three-dimensional (3d) TV, a smart TV, a digital audio recorder, a digital audio player, a digital picture recorder, a digital picture player, a digital video recorder, a digital video player, a storage included in a data center, a device capable of transmitting and receiving information in a wireless environment, any one of various electronic devices forming a home network, any one of various electronic devices forming a computer network, any one of various electronic devices forming a telematics network, a radio frequency identification (RFID) device, or any one of various components forming a computing system.

The memory controller 200 may control the memory 300 based on data received from the host device 10. For example, the memory controller 200 may provide data read from the memory 300 to the host device 10 and may store data provided from the host device 10 in the memory 300. To this end, the memory controller 200 may control operations of the memory 300, such as reading, inputting, programming, erasing, etc. To this end, the memory controller 200 may transmit and receive a command CMD, an address ADDR, and data DATA.

The memory controller 200 may determine whether or not to perform an operation corresponding to a VUC received from the host device 10. According to one or more embodiments, the memory controller 200 may receive a change request Req from the host device 10 and may transmit a result according to the change request Req to the host device 10. The result may be a signal indicating a result of determination of the storage device 20 with respect to whether a state table is changeable, after the host device 10 determines whether the host device 10 is a legitimate user.

The memory 300 may input data DATA in an address ADDR of the memory 300 according to a command CMD received by the memory controller 200. Also, the data DATA stored in the memory 300 may be read and the memory controller 200 may transmit the data DATA to the host device 10.

Figure 3:
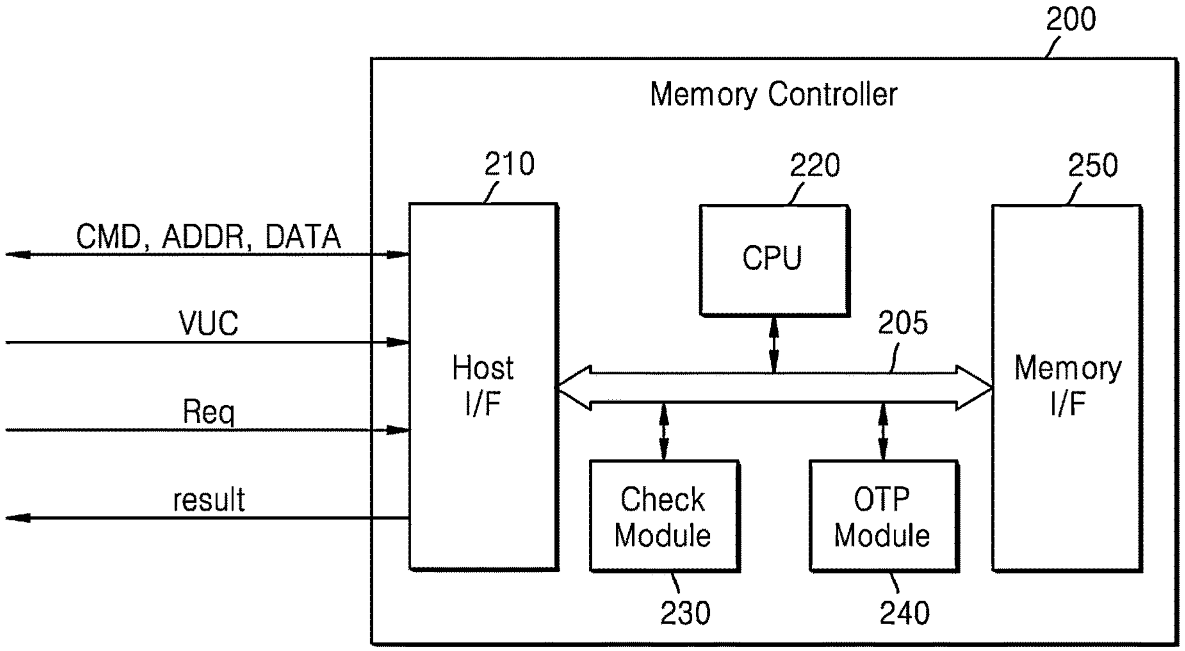
FIG. 3 is a block diagram of a memory controller according to one or more example embodiments.

FIG. 3 is a block diagram of a memory controller according to one or more example embodiments.

Referring to FIG. 3, the memory controller 200 may include a host interface 210, a central processing unit (CPU) 220, a check module 230, a one-time programmable (OTP) module 240, and a memory interface 250. The host interface 210, the CPU 220, the check module 230, the OTP module 240, and the memory interface 250 may communicate with one another through a bus 205.

The host interface 210 may provide interfacing between the host device 10 and the storage device 20 according to a protocol of the host device 10. For example, the host interface 210 may exchange a command CMD, an address ADDR, and data DATA with the host device 10 by using a USB, a small computer system interface (SCSI), peripheral component interconnection (PCI) express (PCIe), advanced technology attachment (ATA), parallel ATA (PATA), serial ATA (SATA), a serial attached SCSI (SAS), etc. Also, for example, the host interface 210 may perform a disk emulation function to assist the host device 10 to recognize the storage device 20 as a hard disk drive (HDD).

The CPU 220 may process a command CMD, an address ADDR, and data DATA received from the host device 10. The CPU 220 may communicate with the host device 10 via the host interface 210 and may control the memory 300 via the memory interface 250. The CPU 220 may control an operation of the memory 300 based on firmware for driving the storage device 20. According to one or more embodiments, as described below, the CPU 220 may determine whether or not the storage device 20 is to perform an operation, based on an operation restriction state of a VUC output by the check module 230. For example, with respect to an arbitrary VUC transmitted from the host device 10, when the check module 230 determines that the VUC is in a lock state, the CPU 220 may not perform an operation corresponding to the VUC.

The check module 230 may output the operation restriction state of the VUC received by the storage device 20 (or the memory controller 200). In detail, as described below, the check module 230 may determine the operation restriction state of the VUC based on a state table. For example, when the VUC received by the storage device 20 is set as a lock state in the state table, the check module 230 may output an indication that the VUC is in an operation-restricted state (or may output "Error").

The OTP module 240 may include a hardware area for storing a logic bit. The logic bit may be data corresponding to an instruction code, which corresponds to each of various VUCs. In more detail, the logic bit may indicate an initial operation restriction state of an instruction code corresponding to a VUC. According to one or more embodiments, when a logic bit corresponding to a certain instruction code is stored as a logic high level in the hardware area of the OTP module 240, the initial state of the VUC corresponding to the certain instruction code may be a lock state. As described above, the OTP module 240 may store the logic bit corresponding to the initial operation restriction state of each of various instruction codes. According to one or more embodiments, the check module 230 may read the logic bit of the OTP module 240 and may set the state table. That is, in this case, the state table may indicate the initial operation restriction state of various VUCs. In this case, when the check module 230 receives the VUC, the check module 230 may determine a state of the VUC (that is, whether or not the VUC is in a lock state) based on the state table.

The memory interface 250 may transmit data DATA received through the bus 205 to the memory 300. Also, the memory interface 250 may transmit data DATA read from the memory 300 to various components of the memory controller 200 through the bus 205. According to one or more embodiments, the memory interface 250 may use a flash memory interface method. In this case, the memory controller 200 may perform an input operation, a read operation, and/or an erase operation according to the flash memory interface method.

As a result, the storage device according to one or more embodiments may perform a control operation with respect to a VUC not by using firmware, etc., but by using hardware. When the control operation with respect to the VUC is performed based on firmware, etc., the firmware may be misused/changed, or the state of the storage device may be falsified or information may be leaked by an attacker who knows the format for controlling the VUC. In particular, when the firmware is leaked, controlling of all the VUCs of storage devices implementing a memory controller of the same format may become possible, and thus, the security may become highly vulnerable. On the contrary, the storage device according to one or more embodiments may perform operation restriction with respect to a VUC based on unique hardware, to make impossible controlling or accessing through firmware, and thus, the security vulnerability may be effectively resolved. That is, a VUC operation may be controlled according to setting by a user rather than by a product provider and at the same time may be controlled by using hardware, and thus, security may be enhanced.

Figure 4:
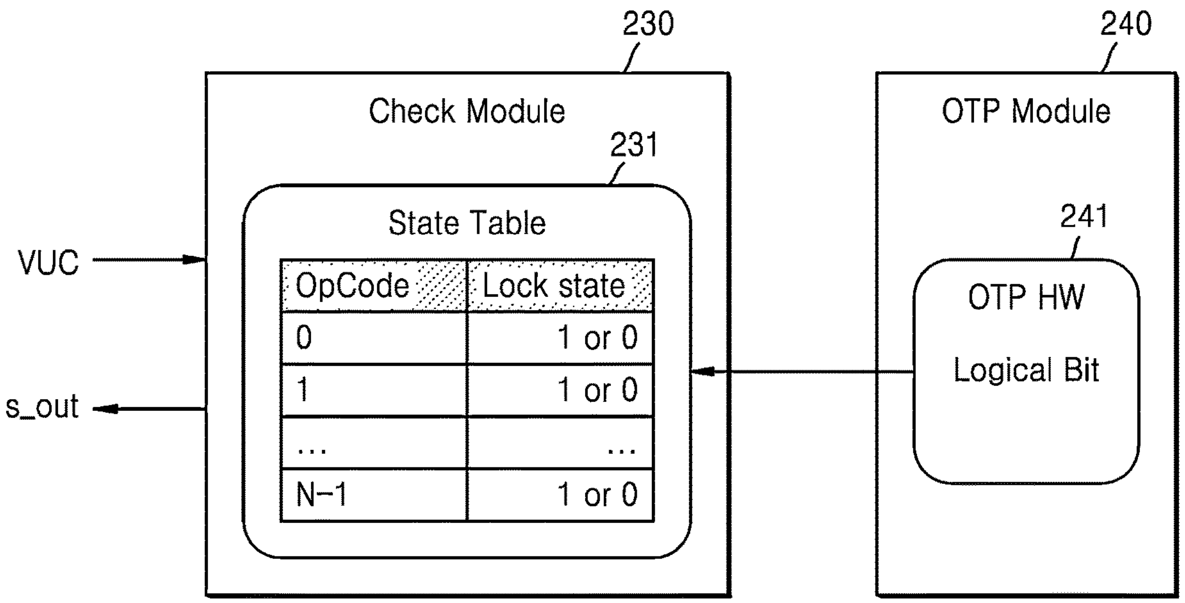
FIG. 4 is a block diagram for describing determination with respect to operation restriction of a vendor unique command (VUC), according to one or more example embodiments.

FIG. 4 is a block diagram for describing determination with respect to operation restriction of a VUC, according to one or more example embodiments. FIG. 5 illustrates an example for describing an operation restriction state of a VUC, according to one or more example embodiments.

Referring to FIGS. 4 and 5, the check module 230 may include a state table 231, and the OTP module 240 may include an OTP hardware area (HW) 241.

The check module 230 may receive a VUC and may output, based on the state table 231, an operation restriction state s_out of the VUC. The state table 230 may be formed based on an instruction code OpCode corresponding to each of VUCs. For example, the state table 231 may include operation restriction states of instruction codes corresponding to N (N is a natural number that is at least one) VUCs. According to one or more embodiments, a first instruction code OpCode corresponding to a first VUC may be represented as 0, and the operation restriction state of the first instruction code OpCode may be represented as a logic high level or a logic low level. For example, the logic high level may correspond to an operation-restricted state (that is, a lock state), and the logic low level may correspond to an operation restriction-release state (that is, an unlock state). Likewise, an $N^{th}$ instruction code corresponding to an $N^{th}$ VUC may be represented as N−1, and the operation restriction state of the $N^{th}$ instruction code may also be represented as a logic high level or a logic low level.

For example, the check module 230 may receive a second VUC, and a second instruction code corresponding to the second VUC may be represented as 1. The state table 231 may set the operation restriction state of the second instruction code as a logic high level, and in this case, based on the state table 231, the check module 230 may output an operation restriction state s_out (or may output "Error") indicating that the second VUC is in an operation-restricted state (that is, a lock state).

However, the corresponding relationships among the VUC, the instruction code, and the operation restriction state as described above are only examples, and the inventive concept is not limited thereto. The configuration and the representation of the state table 231 may be variously implemented.

According to one or more embodiments, the check module 230 may set the state table 231 based on the OTP HW 241 of the OPT module 240. For example, the check module 230 may read a logic bit stored in the OTP HW 241. According to one or more embodiments, the check module 230 may read the logic bit in response to a reset signal (for example, when power is applied to the check module 230). The check module 230 may set the state table 231 based on the logic bit. The logic bit stored in the OTP HW 241 may be data indicating initial operation restriction states of the instruction codes OpCode. According to one or more embodiments, the OTP HW 241 may be a specific hardware area pre-set in the OTP module 240. That is, the OTP HW 241 may be an area in which the pre-set initial operation restriction state of the VUC is stored.

Referring to FIGS. 4 and 5, logic bits stored in the OTP HW 241 may indicate initial operation restriction states of the instruction codes OpCode. For example, a $k^{th}$ bit (k is a natural number that is at least one) of the OTP HW to a $(k+31)^{th}$ bit may indicate initial operation restriction states of first to thirty-second instruction codes, respectively, and a $(k+32)^{th}$ bit to a $(k+63)^{th}$ bit may indicate initial operation restriction states of thirty third to sixty fourth instruction codes, respectively. As described above, the instruction codes may correspond to the VUCs, respectively.

That is, the check module 230 may read a logic bit indicating an initial operation restriction state of an instruction code from the OTP HW 241 of the OTP module 240 and may set the state table 231 corresponding to the instruction code. Also, when the check module 230 receives a VUC, the check module 230 may output an operation restriction state s_out with reference to the state of the instruction code corresponding to the VUC in the state table 231. When the operation restriction state s_out is a lock state (for example, a logic high level), operations corresponding to the VUC may not be performed.

As a result, the storage device according to one or more embodiments may perform a control operation with respect to the VUC based on the unique hardware of the storage device, as described above, and thus, the security vulnerability which may occur when a control operation is performed based on software may be resolved.

Also, the storage device according to one or more embodiments may separately perform a control operation with respect to each VUC, rather than simultaneously performing operation restriction with respect to all of the VUCs. As described above, the instruction codes may not be controlled only in units of one set. Rather, each classified instruction code may be separately controlled. Thus, the convenience for the storage device to perform a control operation with respect to a VUC may be improved.

Figure 6:
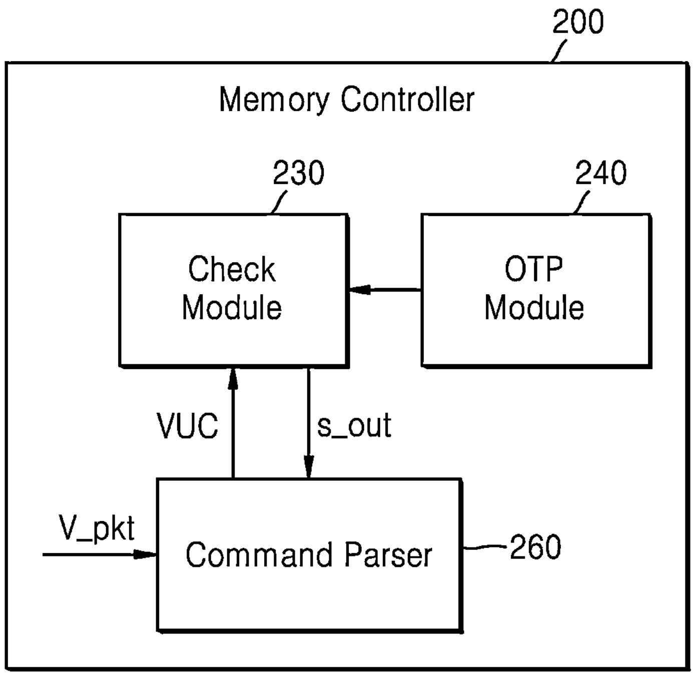
FIG. 6 is a block diagram of a memory controller according to one or more example embodiments.

FIG. 6 is a block diagram of a memory controller according to one or more example embodiments.

Referring to FIG. 6, the memory controller 200 may include the check module 230, the OTP module 240, and an instruction parser 260. Hereinafter, the same description as described with reference to the drawings above may be omitted.

The instruction parser 260 may extract a VUC from a VUC data packet V_pkt received from the host device 10. That is, as described above with reference to FIGS. 1 to 3, while the host device 10 may transmit the VUC, the host device 10 may transmit the VUC in the form of a data packet including information with respect to the VUC. In this case, the instruction parser 260 may extract the VUC from the VUC data packet V_pkt and transmit the VUC to the check module 230. With respect to the VUC received from the instruction parser 260, the check module 230 may output an operation restriction state s_out based on the state table 230 as described above with reference to FIG. 4 and may transmit the operation restriction state s_out to the instruction parser 260. However, the inventive concept is not limited to the present drawing. The instruction parser 260 may be a component included in the check module 230 or may be included in other components of the memory controller 200 and may perform the VUC extraction operation.

Figure 7:
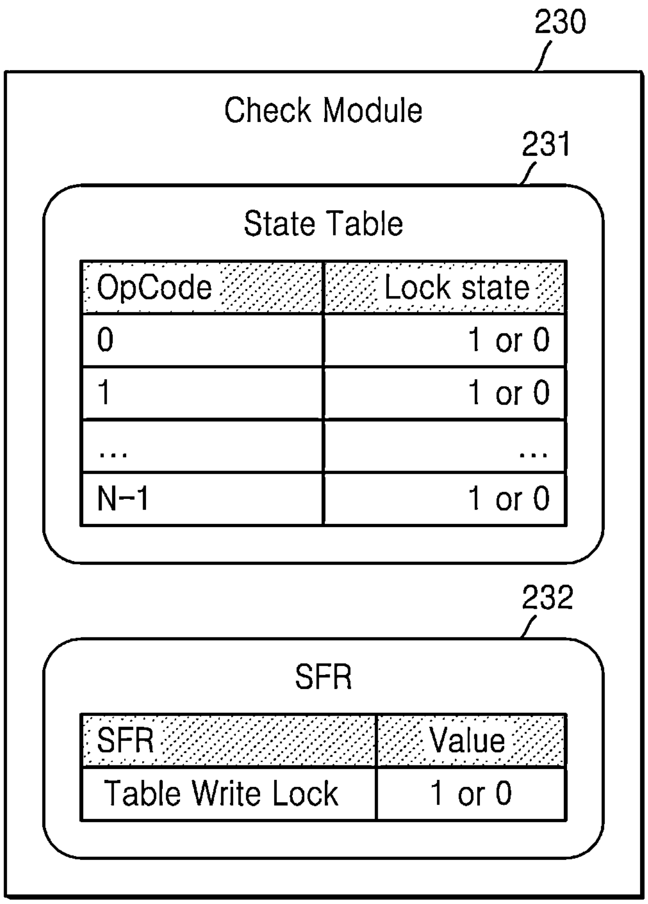
FIG. 7 illustrates an example for describing changing of an operation restriction state of a VUC, according to one or more example embodiments.

FIG. 7 illustrates an example for describing changing of an operation restriction state of a VUC, according to one or more example embodiments.

Referring to FIGS. 4 and 7, the check module 230 may include the state table 231 and a special function register (SFR) 232. As described above, the check module 230 may store the state table 231, based on which whether or not to restrict an operation with respect to the VUC may be determined. For example, the state table 231 may be stored in a register. According to one or more embodiments, the check module 230 may control whether or not to change the state table 231 based on the SFR 232. According to one or more embodiments, when the check module 230 sets the SFR 232 as a logic high level, changing (that is, a write operation) of the state table 231 may not be allowed, and when the check module 230 sets the SFR 232 as a logic low level, changing of the state table 231 may be allowed. According to one or more embodiments, for the security and safety of the VUC, the SFR 232 may be initially in a state in which changing of the state stable 231 is not allowed (that is, a table write lock state or a lock state). In this case, the host device 10, etc. may have to change the state table 231 to control access to the VUC. The check module 230 may control the SFR 232 as described below to control whether or not the state table 231 is changeable.

The storage device according to one or more embodiments may change the operation restriction state of the VUC according to setting by a user. Thus, security with respect to external attacks or information leakage may be enhanced. Also, not only the operation restriction with respect to the VUC may be performed based on hardware, but also changing of the operation restriction state with respect to the VUC may be performed based on hardware, and thus, the security may further be enhanced.

Figure 8:
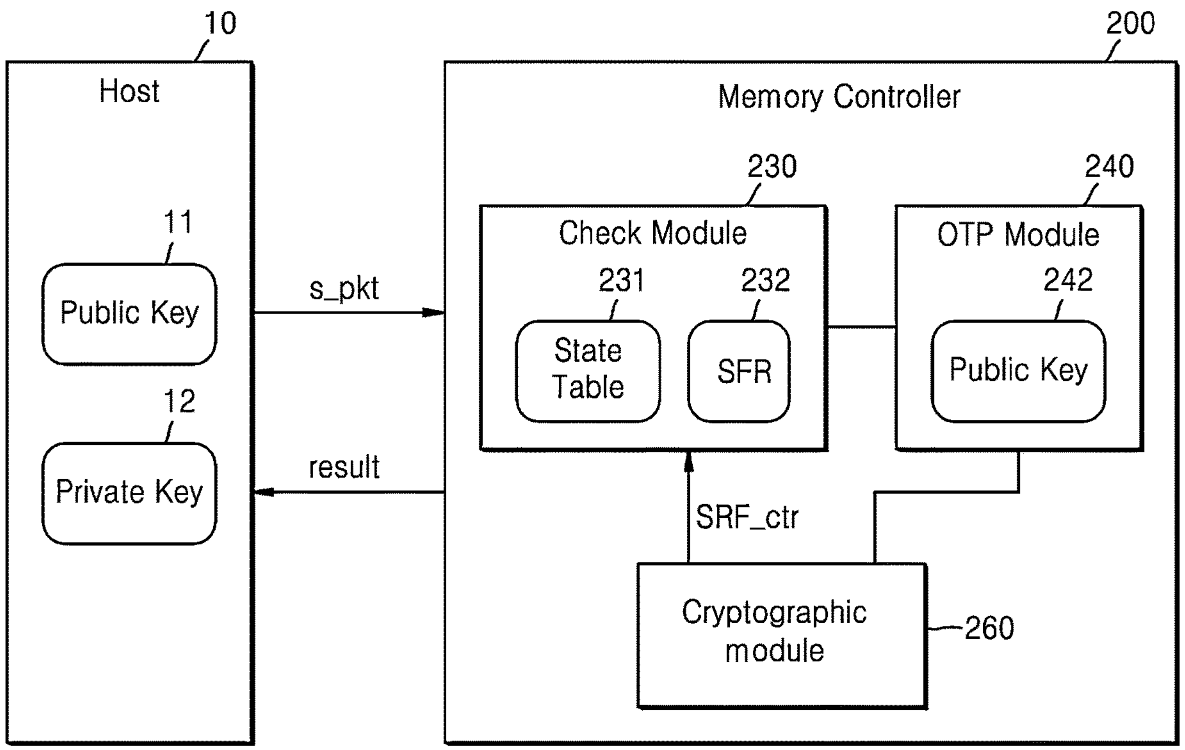
FIG. 8 is a block diagram of a storage device and a memory system according to one or more example embodiments.

FIG. 8 is a block diagram of a storage device and a memory system according to one or more example embodiments.

Referring to FIGS. 7 and 8, the memory controller 200 may include a cryptographic module 260, and the cryptographic module 260 may determine whether or not the host device 10 is a legitimate user. The check module 230 may control whether or not the state table 231 is changeable, based on a result of the determination of the cryptographic module 260. Hereinafter, the same description as described with reference to the drawings above may be omitted.

The host device 10 may include a public key 11 and a private key 12. The host device 10 may provide the public key 11 to the memory controller 200, and the memory controller 200 may store the received public key 11 in the OTP module 240 as an additional public key 242.

According to one or more embodiments, the host device 10 may request the memory controller 200 to change the state table 231 of the check module 230. That is, the host device 10 may need to change of an initially set operation restriction state with respect to a VUC, and thus, may transmit a request for changing the state table 231. For example, as described above, the check module 230 may set the state table 231 by reading a logic bit indicating an initial operation restriction state of the VUC, stored in the OTP module 240, and the host device 10 may request the changing of the state table 231.

As described above, the memory controller 200 may include the SFR 232 configured to control the changing of the state table 231. According to one or more embodiments, the memory controller 200 may determine, based on the cryptographic module 260, whether or not the host device 10 is a legitimate user, before the memory controller 200 controls the SFR 232 in response to the request by the host device 10. The host device 10 may generate a data packet s_pkt signed by using the secret key 12 and transmit the data packet s_pkt to the memory controller 200. The cryptographic module 260 of the memory controller 200 may process the data packet s_pkt by using the public key 242 stored in the OTP module 240. The cryptographic module 260 may compare the data packet s_pkt processed based on the public key 242 with a signature to determine whether the host device 10 is a legitimate user. When the host device 10 is determined to be a legitimate user, the cryptographic module 260 may output a control signal SFR_ctr for controlling the SFR 232 and may transmit the control signal SFR_ctr to the check module 230. However, the present embodiment is only an example embodiment, and the cryptographic module 260 is not limited thereto. The cryptographic module 260 may determine whether or not the host device 10 is a legitimate user based on various encryption/security algorithms, methods, etc.

The check module 230 may control the SFR 232 in response to the control signal SFR_ctr. For example, for the security and stability of the controlling with respect to the VUC, the SFR 232 may be initially set in a lock state (for example, a logic high level), and the check module 230 may change the SFR 232 to a lock release state (for example, a logic low level) in response to the control signal SFR_ctr. Thus, the state table 231 may be changed to a changeable state, and the memory controller 200 may transmit, to the host device 100, a result (i.e., indicating that the state table 231 is changeable) in response to the request by the host device 10. Based on this process, the host device 10 may change the operation restriction state of the VUC.

Figure 9:
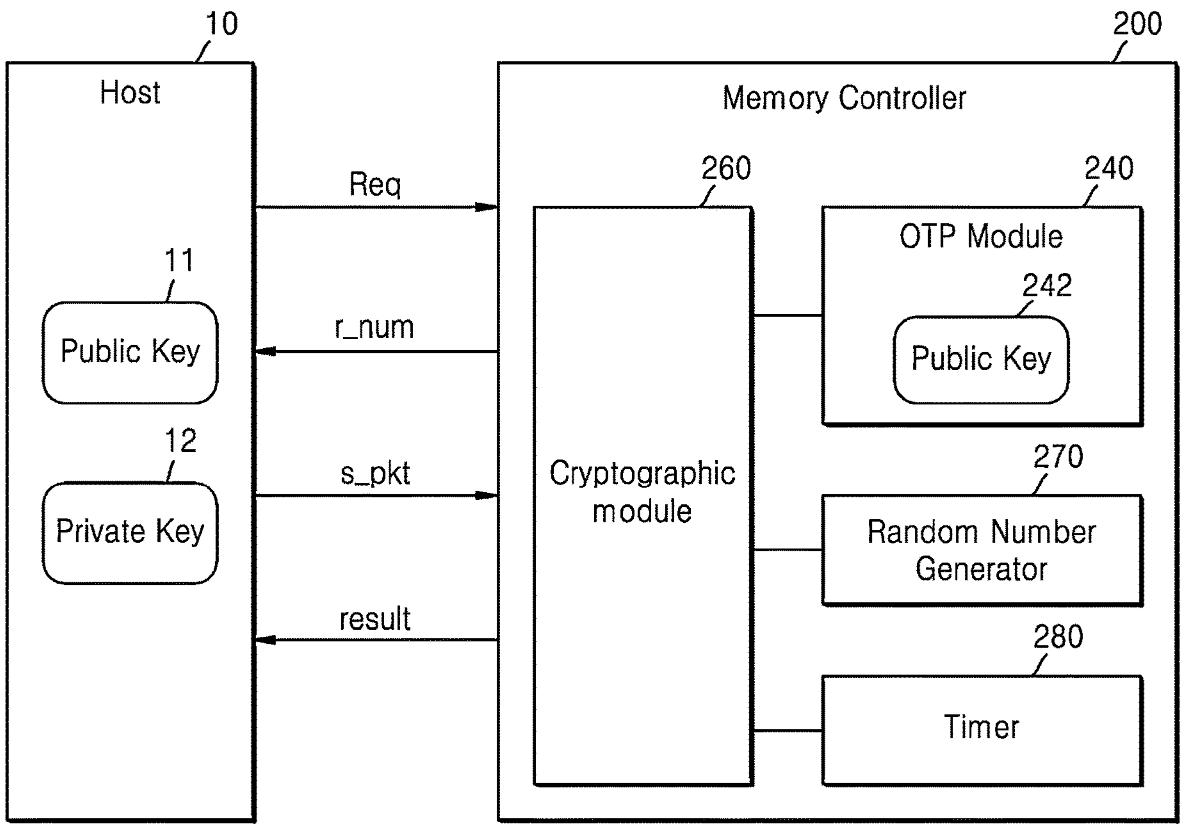
FIG. 9 is a block diagram of a storage device and a memory system according to one or more example embodiments.

FIG. 9 is a block diagram of a storage device and a memory system according to one or more example embodiments.

Referring to FIGS. 8 and 9, the memory controller 200 may further include a random number generator 270 and a timer 280, and the cryptographic module 260 may determine whether or not the host device 10 is a legitimate user by using the random number generator 270 and the timer 280.

According to one or more embodiments, the host device 10 may transmit a change request Req to the memory controller 200 in order to change an operation restriction state of a VUC as described above. The cryptographic module 260 may transmit a random number r_num generated by the random number generator 270 to the host device 10 in response to the change request Req. The host device 10 may generate a data packet s_pkt by packaging (or signing) the received random number r_num by using the secret key 12. The host device 10 may transmit the generated data packet s_pkt to the memory controller 200, and the cryptographic module 260 may process the data packet s_pkt by using the public key 242 stored in the OTP module 240. Here, according to one or more embodiments, to prevent indiscrete (repeated) (that is, malicious) transmission of the data packet s_pkt by the host device 10, the cryptographic module 260 may receive, from the timer 280, a valid period of the random number r_num. For example, when the data packet s_pkt is received after the valid period received from the timer 280 has passed, the cryptographic module 260 may determine that the host device 10 is not a legitimate user, without additional determination with respect to the data packet s_pkt. When the data packet s_pkt is received within the valid period, and data obtained by processing the data packet s_pkt is the same as the random number r_num provided to the host device 10, the cryptographic module 260 may determine that the host device 10 is a legitimate user. On the contrary, when the data packet s_pkt is received within the valid period, but the data obtained by processing the data packet s_pkt is not the same as the random number r_num provided to the host device 10, the cryptographic module 260 may determine that the host device 10 is not a legitimate user. The memory controller 200 may transmit a determination result of the cryptographic module 260 to the host device 10.

Figure 10:
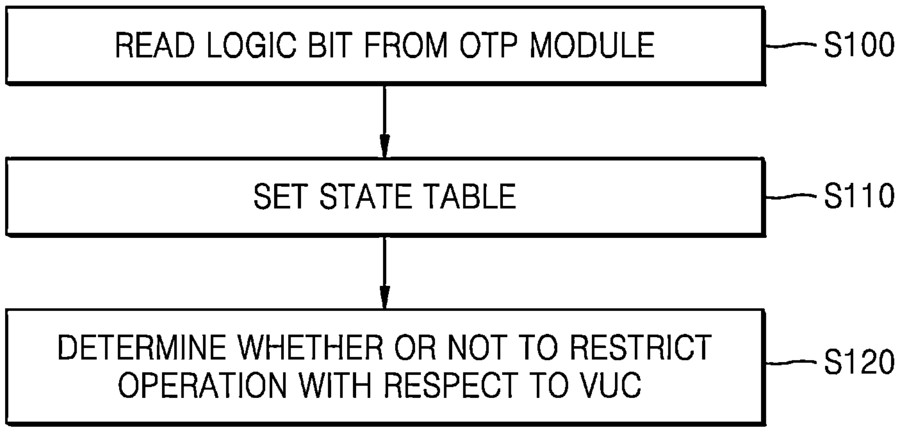
FIG. 10 is a flowchart of a method of controlling a VUC, according to one or more example embodiments.

FIG. 10 is a flowchart of a method of controlling a VUC, according to one or more example embodiments.

Referring to FIG. 10, the method of controlling the VUC according to one or more embodiments may include a plurality of operations S100, S110, and S120. Hereinafter, FIG. 10 is described with reference to the drawings above, and the same descriptions as in the drawings above may not be repeated.

In operation S100, the check module 230 may read, from the OTP module 240, a logic bit, which may be data indicating an initial operation restriction state of an instruction code corresponding to the VUC. According to one or more embodiments, the logic bit may be data stored in the OTP HW 241 of the OTP module 240, and the OTP HW 241 may be a specific hardware area pre-set in the OTP module 240. That is, the OTP HW 241 may be an area in which a pre-set initial operation restriction state of the VUC is stored.

In operation S110, the check module 230 may set the state table 231 based on the logic bit read from the OTP module 240. The state table 231 may be configured to correspond to instruction codes OpCode respectively corresponding to VUCs. That is, the state table 231 may indicate operation restriction states of the VUCs.

In operation S120, the check module 230 may determine, based on the state table 231, whether or not to restrict an operation with respect to the VUC received from the host 10. For example, when the VUC received by the check module 230 is set as a lock state in the state table 231, the check module 230 may output an operation restriction state s_out indicating that the VUC is in an operation-restricted state.

Figure 11:
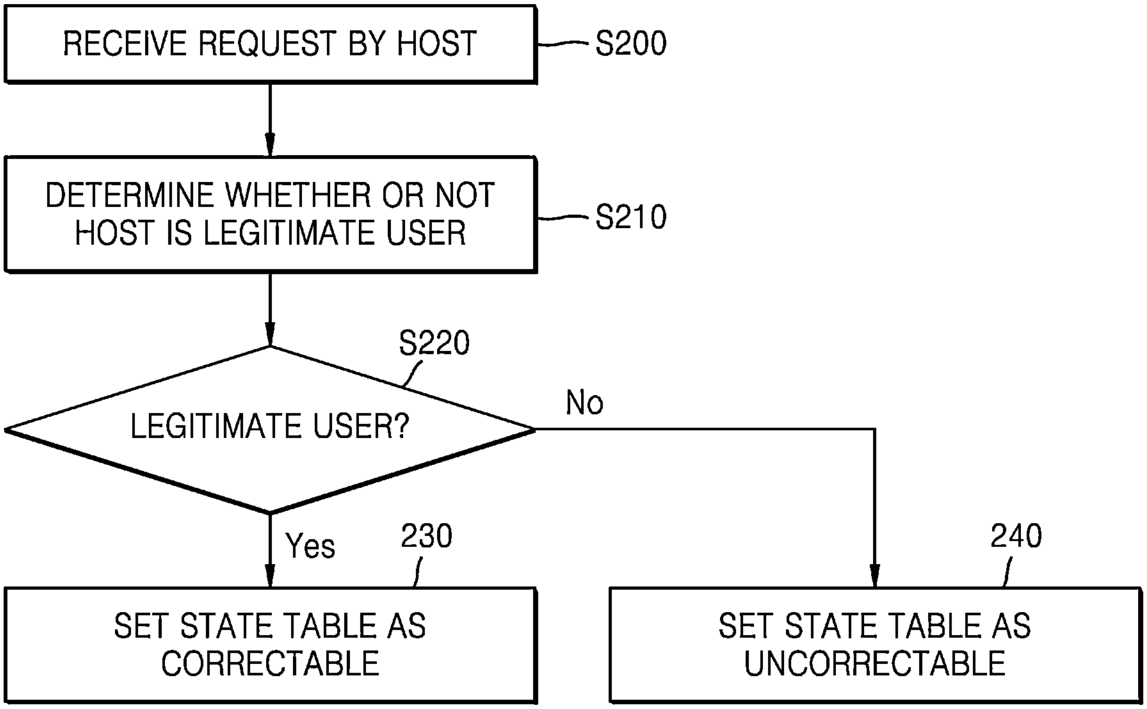
FIG. 11 is a flowchart of a method of changing an operation restriction state of a VUC, according to one or more example embodiments.

FIG. 11 is a flowchart of a method of changing an operation restriction state of a VUC, according to one or more example embodiments.

Referring to FIG. 11, the method of changing the operation restriction state of the VUC according to one or more embodiments, may include a plurality of operations S200, S210, S220, S230, and S240. Hereinafter, FIG. 11 is described with reference to the drawings above, and the same descriptions as in the drawings above are not repeated.

In operation S200, the memory controller 200 may receive a change request Req with respect to the state table 231 from the host device 10. That is, the host device 10 may need a change of an operation restriction state that is initially set with respect to a VUC, and thus, may transmit the change request Req to the memory controller 200 to change the state table 231. The memory controller 200 may control whether or not the state table 231 is changeable through operations S210 to S240.

In operation S210, in response to the change request Req from the host device 10, the memory controller 200 may determine, via the cryptographic module 260, whether or not the host device 10 is a legitimate user. According to one or more embodiments, the cryptographic module 260 may process a data packet s_pkt received from the host device 10 by using the public key 242 and compare the data packet s_pkt with a signature, and thus, may determine whether the host device 10 is a legitimate user. Also, according to one or more embodiments, the cryptographic module 260 may use a random number r_num generated by the random number generator 270 and the timer 280 configured to set a valid period of the random number r_num, to determine whether the host device 10 is a legitimate user.

When it is determined that the host device 10 is a legitimate user (Yes in operation S220), in operation S230, the memory controller 200 may set the state table 231 as a changeable state. The cryptographic module 260 may transmit a control signal SFR_ctr for controlling the SFR 232 to the check module 230, and based on the control signal SFR_ctr, the check module 230 may change the SFR 232 to a lock release state (for example, a logic low level). The state table 231 may be controlled as a changeable state. On the contrary, when it is determined that the host device 10 is not a legitimate user (No in operation S220), in operation S240, the SFR 232 may be maintained in a lock state or changed as a lock state (for example, a logic high level), and the state table 231 may be controlled as an unchangeable state.

Figure 12:
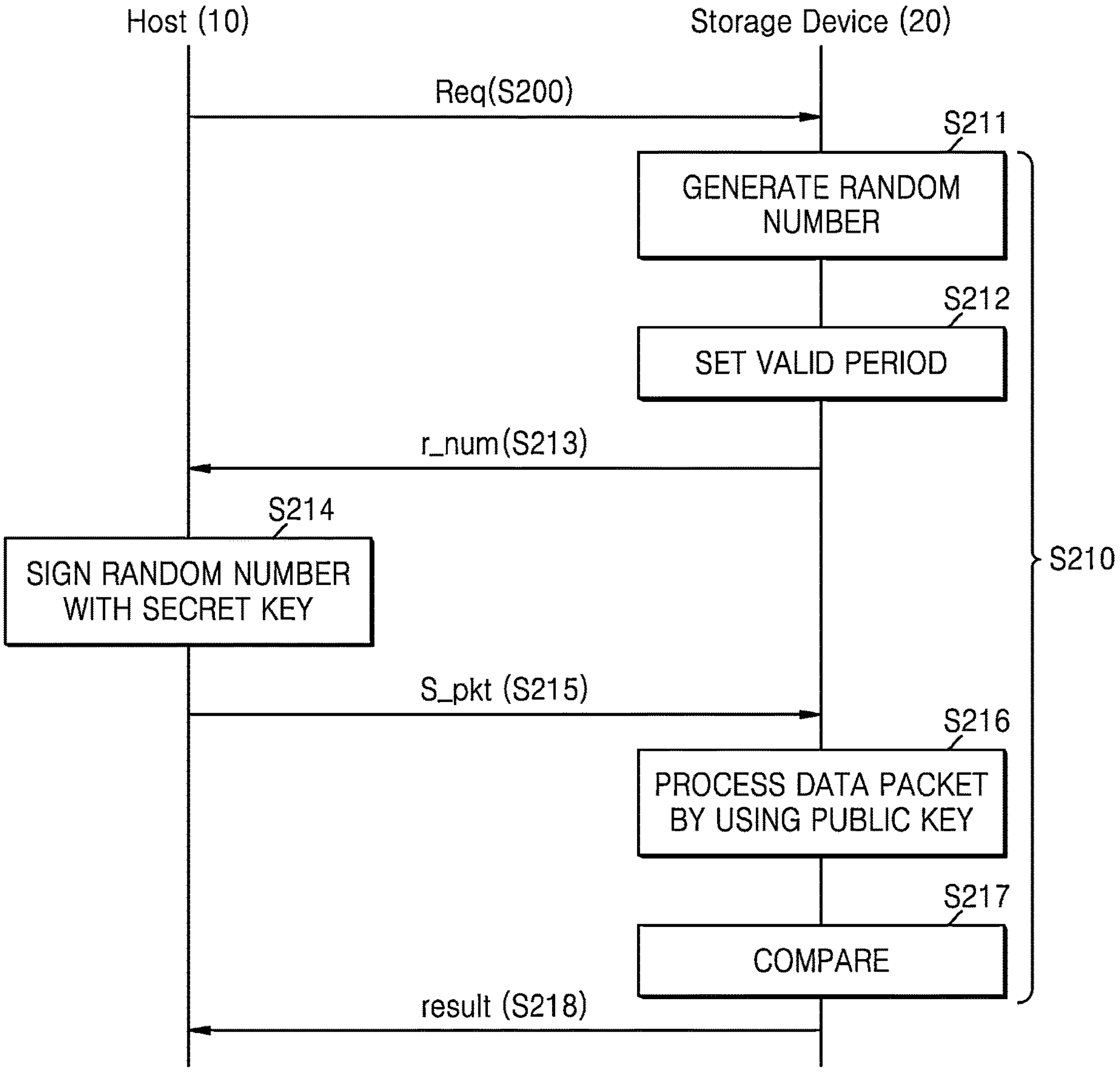
FIG. 12 is a flowchart of a method of controlling a VUC, according to one or more example embodiments.

FIG. 12 is a flowchart of a method of controlling a VUC, according to one or more example embodiments.

Referring to FIGS. 11 and 12, operation S210 in which whether or not the host device 10 is a legitimate user is determined may include a plurality of operations S211 to S217. Hereinafter, FIG. 12 is described with reference to the drawings above, and the same descriptions as in the drawings above may not be repeated.

As described above, in operation S200, the storage device 20 may receive, from the host device 10, a change request Req for changing the state table 231. To determine whether or not the host device 10 is a legitimate user, in response to the change request Req, the storage device 20 may generate a random number r_num by using the random number generator 270 in operation S211 and may set, through the timer 280, a valid period of the random number r_num in operation S212. In operation S213, the storage device 20 may transmit the random number r_num to the host device 10, and in operation S214, the host device 10 may sign the random number r_num by using the secret key 12 to generate a data packet s_pkt. In operation S215, the host device 10 may transmit the data packet s_pkt to the storage device 20, and the storage device 20 may process the data packet s_pkt through the public key 242 in operation S216 and may compare the data packet s_pkt with the signature so as to determine whether the host device 10 is a legitimate user in operation S217. In operation S218, the storage device 20 may transmit a result of determination of whether the host device 10 is a legitimate user to the host device 10.

Figure 13:
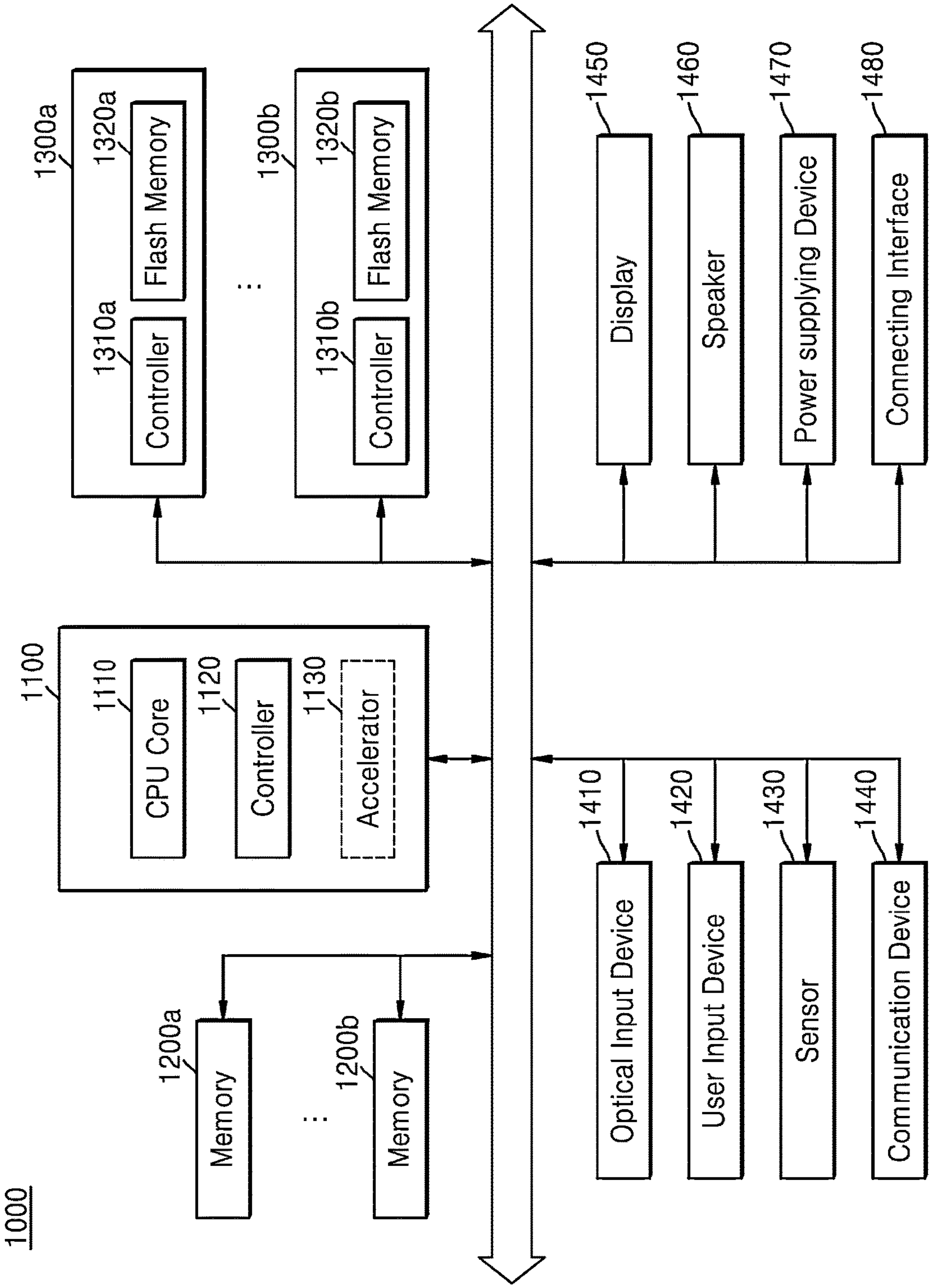
FIG. 13 is a diagram of a system including a storage device according to one or more example embodiments.

FIG. 13 is a diagram of a system 1000 including a storage device according to one or more example embodiments.

The system 1000 of FIG. 13 may be basically a mobile system, such as a mobile communication terminal (a mobile phone), a smartphone, a table PC, a wearable device, a health care device, or an Internet of Things (IoT) device. However, the system 1000 of FIG. 13 is not necessarily limited to a mobile system and may include a personal computer, a laptop computer, a server, a media player, or an automotive device such as a navigation device.

Referring to FIG. 13, the system 1000 may include a main processor 1100, memories 1200*a* and 1200*b*, and storage devices 1300*a* and 1300*b* and may further include at least one of an image capturing device (or optical input device) 1410, a user input device 1420, a sensor 1430, a communication device 1440, a display 1450, a speaker 1460, a power supply device 1470, and a connecting interface 1480.

The main processor 1100 may control general operations of the system 1000, in particular, operations of other components included in the system 1000. The main processor 1100 may be implemented as a general-purpose processor, an exclusive processor, an application processor, and/or the like.

The main processor 1100 may include one or more CPU cores 1100 and may further include a controller 1120 configured to control the memories 1200*a* and 1200*b* and/or the storage devices 1300*a* and 1300*b*. According to one or more embodiments, the main processor 1100 may further include an accelerator block 1130 which is an exclusive circuit for high-speed data operation, such as artificial intelligence (AI) data operation. The accelerator block 1130 may include a graphics processing unit (GPU), a neural processing unit (NPU), and/or a data processing unit (DPU) and may be implemented as an individual chip physically separate from other components of the main processor 1100.

The memories 1200*a* and 1200*b* may be used as main memory devices of the system 1000. The memories 1200*a* and 1200*b* may not only include a volatile memory, such as an SRAM and/or a DRAM, but may also include a nonvolatile memory, such as a flash memory, a PRAM, and/or a RRAM. The memories 1200*a* and 1200*b* may also be implemented in the same package as the main processor 1100.

The storage devices 1300*a* and 1300*b* may function as nonvolatile storage devices storing data regardless of power supply and may have relatively greater storage capacities than the memories 1200*a* and 1200*b*. The storage devices 1300*a* and 1300*b* may include storage controllers 1310*a* and 1310*b* and nonvolatile storages 1320*a* and 1320*b* storing data according to control by the storage controllers 1310*a* and 1310*b*. The nonvolatile storages 1320*a* and 1320*b* may include V-NAND flash memories having a two-dimensional (2d) structure or a three-dimensional (3d) structure, but may also include other types of nonvolatile memories such as PRAM and/or RRAM.

The storage devices 1300*a* and 1300*b* may be included in the system 1000 physically separately from the main processor 1100 or may be implemented in the same package as the main processor 1100. Also, the storage devices 1300*a* and 1300*b* may have the form such as an SSD or a memory card and may be detachably coupled to other components of the system 1000 through an interface such as the connecting interface 1480 to be described below. The storage devices 1300*a* and 1300*b* may be devices to which standard rules such as a UFS, an eMMC, or non-volatile memory express (NVMe) are applied, but the storage devices 1300*a* and 1300*b* are not necessarily limited thereto.

The storage devices 1300*a* and 1300*b* may include the OTP module, the check module, the command parser, and the cryptographic module described with reference to FIGS. 1 to 12. The storage devices 1300*a* and 1300*b* may perform a control operation with respect to a VUC based on exclusive hardware, and thus, may resolve the security vulnerability of a control operation based on software.

The image capturing device 1410 may capture a still image or a video image and may include a camera, a camcorder, and/or a webcam.

The user input device 1420 may receive various types of data that are input by a user of the system 1000 and may include a touch pad, a keypad, a keyboard, a mouse, and/or a microphone.

The sensor 1430 may sense various types of physical quantities which may be obtained from the outside of the system 1000 and may convert the sensed physical quantities into electrical signals. The sensor 1430 may include, for example, a temperature sensor, a pressure sensor, an illuminance sensor, a position sensor, an acceleration sensor, a biosensor, and/or a gyroscope, etc.

The communication device 1440 may transmit and receive a signal to and from other devices outside the system 1000 according to various communication rules. The communication device 1440 may be implemented by including, for example, an antenna, a transceiver, and/or a modem, etc.

The display 1450 and the speaker 1460 may function as output devices outputting visual information and audial information, respectively, to the user of the system 1000.

The power supply device 1470 may appropriately convert power supplied from an embedded battery (not shown) and/or an external power source and provide the power to each of the components of the system 1000.

The connecting interface 1480 may provide connection between the system 1000 and an external device which may be connected to the system 1000 and may exchange data with the system 1000. The connecting interface 1480 may include various interfaces, such as ATA, SATA, external SATA (e-SATA), an SCSI, an SAS, PCI, PCIe, NVMe, IEEE 1394, a USB, an SD card, an MMC, an eMMC, a UFS, an embedded universal flash storage (eUFS), a CF card interface, etc.

Figure 14:
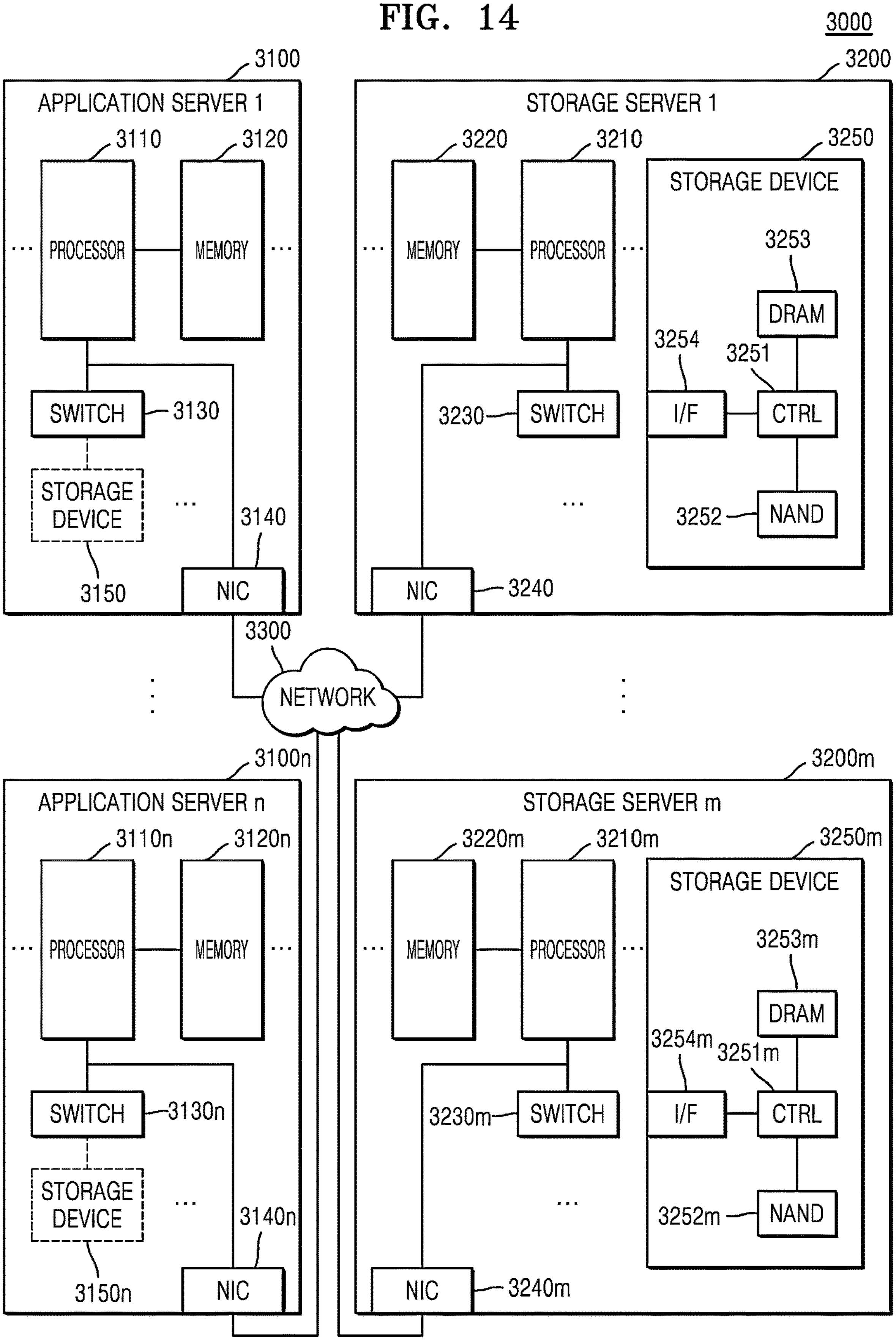
FIG. 14 is a diagram of a data center including a memory device according to one or more example embodiments.

FIG. 14 is a diagram of a data center 3000 including a memory device according to one or more example embodiments.

Referring to FIG. 14, the data center 3000 may collect and provide various types of data and various types of services and may also be referred to as a data storage center. The data center 3000 may include a system for operating a search engine and a database and may include a computing system used in, for example but not limited to, a company such as a bank, etc. or a government agency. The data center 3000 may include application servers 3100 to 3100*n* (n being an integer equal to or greater than two) and storage servers 3200 to 3200*m* (m being an integer equal to or greater than two). The number of application servers 3100 to 3100*n* and the number of storage servers 3200 to 3200*m* may be variously selected according to one or more embodiments, and the number of application servers 3100 to 3100*n* and the number of storage servers 3200 to 3200*m* may be the same or different from each other.

The application server 3100 and/or the storage server 3200 may include at least one processor (e.g., 3110, 3210) and at least one memory (e.g., 3120, 3220). To describe the storage server 3200 as an example, the processor 3210 may control general operations of the storage server 3200 and may access the memory 3220 and execute an instruction and/or data loaded on the memory 3220. The memory 3220 may include, for example but not limited to, a double data rate synchronous DRAM (DDR SDRAM), a high bandwidth memory (HBM), a hybrid memory cube (HMC), a dual in-line memory module (DIMM), an Optane DIMM, and/or a non-volatile DIMM (NVMDIMM). According to one or more embodiments, the number of processors 3210 and the number of memories 3220 included in the storage server 3200 may be variously selected. According to one or more embodiments, the processor 3210 and the memory 3220 may provide a processor-memory pair. According to one or more embodiments, the number of processors 3210 and the number of memories 3220 may be different from each other. The processor 3210 may include a single-core processor or a multi-core processor. The descriptions with respect to the storage server 3200 above may be likewise applied to the application server 3100. According to one or more embodiments, the application server 3100 may not include a storage device 3150. The storage server 3200 may include one or more storage devices 3250. The number of storage devices 3250 included in the storage server 3200 may be variously selected according to one or more embodiments.

The application servers 3100 to 3100*n* and the storage servers 3200 to 3200*m* may communicate with each other through a network 3300. The network 3300 may be implemented by using a fibre channel (FC), the Ethernet, and/or the like. Here, the FC may refer to a medium used for relatively high-speed data transmission and may use an optical switch that provides high performance and/or high availability. According to an access type of the network 3300, the storage servers 3200 to 3200*m* may be provided as a file storage, a block storage, and/or an object storage.

According to one or more embodiments, the network 3300 may include a storage-exclusive network, such as a storage area network (SAN). For example, the SAN may include an FC-SAN capable of using an FC network and may be implemented according to an FC protocol (FCP). Alternatively, the SAN may include an IP-SAN using a TCP/IP network and may be implemented according to an SCSI over TCP/IP or Internet SCSI (iSCSI) protocol. According to another embodiment, the network 3300 may include a general network like the TCP/IP network. For example, the network 3300 may be implemented according to a protocol, such as an FC over the Ethernet (FCoE), a network attached storage (NAS), NVMe over fabrics (NVMe-oF), etc.

Hereinafter, the application server 3100 and the storage server 3200 are mainly described. The description with respect to the application server 3100 may be applied to the application server 3100*n*, and the description with respect to the storage server 3200 may be applied to the storage server 3200*m*.

The application server 3100 may store data requested to be stored by a user and/or a client in one of the storage servers 3200 to 3200*m* through the network 3300. Also, the application server 3100 may obtain data requested to be read by the user and/or the client from one of the storage servers 3200 to 3200*m* through the network 3300. For example, the application server 3100 may include a web server, a database management system (DBMS), and/or the like.

The application server 3100 may access a memory 3120*n* and/or a storage device 3150*n* included in the application 3100*n* through the network 3300. Alternatively or additionally, the application server 3100 may access memories 3220 to 3220*m* and/or storage devices 3250 to 3250*m* included in the storage servers 3200 to 3200*m* through the network 3300. By doing so, the application server 3100 may perform various operations on data stored in the application servers 3100 to 3100*n* and/or the storage servers 3200 to 3200*m*. For example, the application server 3100 may execute an instruction to move or copy data between the application servers 3100 to 3100*n* and/or the storage servers 3200 to 3200*m*. Here, the data may be moved from the storage devices 3250 to 3250*m* of the storage servers 3200 to 3200*m* to the memories 3120 to 3120*n* of the application servers 3100 to 3100*n* directly, or through the memories 3220 to 3220*m* of the storage servers 3200 to 3200*m*. The data moved through the network 3300 may be data encrypted for security or privacy.

To describe the storage server 3200 as an example, an interface 3254 may provide physical connection between the processor 3210 and a controller 3251 and physical connection between a network interconnect (NIC) 3240 and the controller 3251. For example, the interface 3254 may include a direct attached storage (DAS) whereby the storage device 3250 is directly connected by an exclusive cable. Also, for example, the interface 3254 may include various interfaces, such as, but not limited to ATA, SATA), e-SATA, an SCSI, an SAS, PCI, PCIe, NVMe, IEEE 1394, a USB, an SD card, an MMC, an eMMC) a UFS, an eUFS, and/or a CF card interface.

The storage server 3200 may further include a switch 3230 and the NIC 3240. The switch 3230 may selectively connect the processor 3210 with the storage device 3250 or selectively connect the NIC 3240 with the storage device 3250 according to control by the processor 3210.

According to one or more embodiments, the NIC 3240 may include a network interface card, a network adaptor, etc. The NIC 3240 may be connected to the network 3300 through a wireless interface, a wireless interface, a Bluetooth interface, an optical interface, etc. The NIC 3240 may include an internal memory, a digital signal processor (DSP), a host bus interface, etc. and may be connected with the processor 3210 and/or the switch 3230 through the host bus interface. The host bus interface may be implemented as one of the examples of the interface 3254 described above. According to one or more embodiments, the NIC 3240 may be combined with at least one of the processor 3210, the switch 3230, and the storage device 3250.

The processor in the storage servers 3200 to 3200*m* and/or the application servers 3100 to 3100*n* may transmit a command to the storage devices 3150 to 3150*n* and 3250 to 3250*m* or the memories 3120 to 3120*n* and 3220 to 3220*m* to program or read data. Here, the data may be data on which error correction is performed through an error correction code (ECC) engine. The data may be data, on which data bus inversion (DBI) or data masking (DM) is processed, and may include cyclic redundancy code (CRC) information. The data may be encrypted for security or privacy.

The storage devices 3150 to 3150*n* and 3250 to 3250*m* may transmit a control signal and a command/address signal to NAND flash memory devices 3252 to 3252*m* in response to a read command received from the processor. When data is read from the NAND flash memory devices 3252 to 3252*m* in response thereto, a read enable (RE) signal may be input as a data output control signal to output data through a DQ bus. A data strobe DQS may be generated by using an RE signal. The command/address signal may be latched in a page buffer according to a rising edge or a falling edge of a write enable (WE) signal.

The controller 3251 may generally control operations of the storage device 3250. According to one or more embodiments, the controller 3251 may include an SRAM. The controller 3251 may write data to the NAND flash 3252 in response to a write command or read data from the NAND flash 3252 in response to a read command. For example, the write command and/or the read command may be provided from the processor 3120 in the storage server 3200, the processor 3120*m* in the storage server 3200*m*, and/or the processors 3110 and 3110*n* in the application servers 3100 and 3100*n*. A DRAM 3253 may temporarily store (buffer) the data to be written in the NAND flash 3252 or the data read from the NAND flash 3252. Also, the DRAM 3253 may store metadata. Here, the metadata may be generated by the controller 3251 to manage user data or the NAND flash 3252. The storage device 3250 may include a secure element (SE) for security or privacy.

According to one or more embodiments, the storage devices 3150 to 3150*n* and 3250 to 3250*m* may include the OTP module and the check module, and also may further include the command parser and/or the cryptographic module described with reference to FIGS. 1 to 12. The storage devices 3150 to 3150*n* and 3250 to 3250*m* may control a VUC operation according to setting by a user rather than setting by a manufacturer, and at the same time, may perform separate controlling for each VUC. Thus, not only the security, but also the convenience in performing a control operation with respect to the VUC by the storage device may be improved.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, and/or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the inventive concept has been particularly shown and described with reference to example embodiments thereof, it will be understood that various changes in form and details may be made therein without departing from the spirit and scope of the following claims.

What is claimed is:

1. A storage device comprising:

a memory; and a memory controller configured to control the memory, wherein the memory controller includes a one-time programmable (OTP) module, the OTP module including a hardware area and being configured to store, in the hardware area, logic bits indicating initial values of operation restriction states of a plurality of instruction codes, and wherein the memory controller is configured to output an operation restriction state of a vendor unique command (VUC) based on a state table, the state table comprising a plurality of operation restriction states of the plurality of instruction codes, corresponding to a plurality of VUCs, based on the logic bits.

2. The storage device of claim 1, wherein the memory controller is further configured to set the state table based on the logic bits.

3. The storage device of claim 2, wherein the memory controller is further configured to read the logic bits stored in the hardware area of the OTP module.

4. The storage device of claim 1, wherein the memory controller is further configured to extract the VUC from data received from a host.

5. The storage device of claim 4, wherein the memory controller is configured to not perform an operation according to the VUC based on the operation restriction state of the VUC being a lock state.

6. The storage device of claim 1, wherein the memory controller is further configured to control whether the state table is changeable.

7. The storage device of claim 6, wherein the state table is initially set to be unchangeable.

8. The storage device of claim 6, wherein the memory controller is further configured to determine whether a host requesting to change the state table is a legitimate user.

9. The storage device of claim 8, wherein the memory controller is further configured to determine whether the host is the legitimate user by processing a data packet received from the host by using a public key.

10. The storage device of claim 8, wherein the memory controller is further configured to set the state table as changeable based on a result of a determination whether the host is the legitimate user.

11. The storage device of claim 8, wherein the memory controller is further configured to transmit, in response to a request by the host, a random number generated by a random-number generator to the host.

12. The storage device of claim 11, wherein the memory controller is further configured to receive a valid period of the random number from a timer.

13. A method of controlling a vendor unique command (VUC), the method comprising:

extracting logic bits from a one-time programmable (OTP) module, the logic bits indicating initial values of operation restriction states of a plurality of instruction codes;

setting, based on the logic bits, a state table comprising a plurality of operation restriction states of the plurality of instruction codes, corresponding to a plurality of VUCs; and determining, based on the state table, whether an operation restriction is set with respect to the VUC received from a host.

14. The method of claim 13, wherein the extracting comprises extracting the logic bits stored in a specific area of the OTP module.

15. The method of claim 13, further comprising controlling whether the state table is changeable in response to a request by the host.

16. The method of claim 15, wherein the controlling whether the state table is changeable includes:

determining whether the host is a legitimate user; and setting the state table as changeable based on a determination that the host is the legitimate user.

17. The method of claim 16, wherein the determining whether the host is the legitimate user includes processing a data packet received from the host by using a public key.

18. The method of claim 16, wherein the determining whether the host is the legitimate user includes:

generating a random number and transmitting the random number to the host; and setting a valid period of the random number.

19. A memory system comprising:

a host device configured to output a vendor unique command (VUC); and a storage device configured to determine whether an operation restriction is set with respect to the VUC, wherein the storage device includes a one-time programmable (OTP) module, the OTP module including a hardware area and being configured to store, in the hardware area, logic bits indicating initial values of operation restriction states of a plurality of instruction codes; and wherein the storage device is further configured to set a state table comprising a plurality of operation restriction states of the plurality of instruction codes, corresponding to a plurality of VUCs, based on the logic bits.

20. The memory system of claim 19, wherein the host device is further configured to transmit a request to change the state table to the storage device, wherein the storage device is further configured to, in response to the request, determine whether the host device is a legitimate device, and wherein the storage device is further configured to set the state table as changeable based on a result of a determination whether the host device is the legitimate device.

* * * * *